(12) United States Patent
Mangano et al.

(10) Patent No.: US 9,389,979 B2
(45) Date of Patent: Jul. 12, 2016

(54) DEBUG SYSTEM, AND RELATED INTEGRATED CIRCUIT AND METHOD

(71) Applicants: STMicroelectronics (Grenoble 2) SAS, Grenoble (FR); STMicroelectronics S.r.l., Agrate Brianza (IT)

(72) Inventors: Daniele Mangano, San Gregorio di Catania (IT); Ignazio Antonino Urzi, Voreppe (FR)

(73) Assignees: STMICROELECTRONICS (GRENOBLE 2) SAS, Grenoble (FR); STMICROELECTRONICS S.R.L., Agrate Brianza (IT)

( * ) Notice: Subject to any disclaimer, the term of this patent is extended or adjusted under 35 U.S.C. 154(b) by 237 days.

(21) Appl. No.: 14/038,501

(22) Filed: Sep. 26, 2013

(65) Prior Publication Data
US 2014/0095932 A1    Apr. 3, 2014

(30) Foreign Application Priority Data

Sep. 28, 2012  (IT) ............................... TO2012A0851

(51) Int. Cl.
G06F 11/00 (2006.01)
G06F 11/27 (2006.01)
G06F 11/36 (2006.01)
G06F 11/22 (2006.01)

(52) U.S. Cl.
CPC ............ *G06F 11/27* (2013.01); *G06F 11/2236* (2013.01); *G06F 11/3648* (2013.01)

(58) Field of Classification Search
CPC . G06F 11/27; G06F 11/2236; G06F 11/3648; G06F 11/26; G06F 11/263; G06F 11/267; G06F 11/273; G06F 11/277
See application file for complete search history.

(56) References Cited

U.S. PATENT DOCUMENTS

| 7,225,285 | B1 * | 5/2007 | Fairman | G06F 13/24 710/266 |
| 8,429,457 | B2 * | 4/2013 | Harris | G06F 11/263 714/25 |
| 8,793,095 | B2 * | 7/2014 | Patil | G01R 1/318508 702/117 |
| 2012/0233514 | A1 | 9/2012 | Patil et al. | |

OTHER PUBLICATIONS

Ciordas et al., "An Event-Based Monitoring Service for Networks on Chip," *ACM Transactions on Design Automation of Electronic Systems* 10(4):702-723, Oct. 2005.
Fiorin et al., "A Monitoring System for NoCs," NoCArc '10 Proceedings of the Third International Workshop on Network on Chip Architectures, Atlanta, Georgia, Dec. 4, 2010, 6 pages.
Saponara et al., "Design and coverage-driven verification of a novel network-interface IP macrocell for network-on-chip interconnects," *Microprocessors and Microsystems* 35(6):579-592, 2011.

* cited by examiner

*Primary Examiner* — Bryce Bonzo
*Assistant Examiner* — Anthony J Amoroso
(74) *Attorney, Agent, or Firm* — Seed IP Law Group PLLC

(57) ABSTRACT

A system includes a processor and a plurality of circuits connected through an interconnection network, wherein associated to each circuit is a respective communication interface configured for exchanging data between the respective circuit and the interconnection network. In particular, a debug unit is associated with each communication interface. Each debug unit is configurable as a data-insertion point, wherein the debug unit transmits data by means of the respective communication interface to the interconnection network, or each debug unit is configurable as a data-reception point, wherein the debug unit receives data by means of the respective communication interface from the interconnection network.

17 Claims, 5 Drawing Sheets

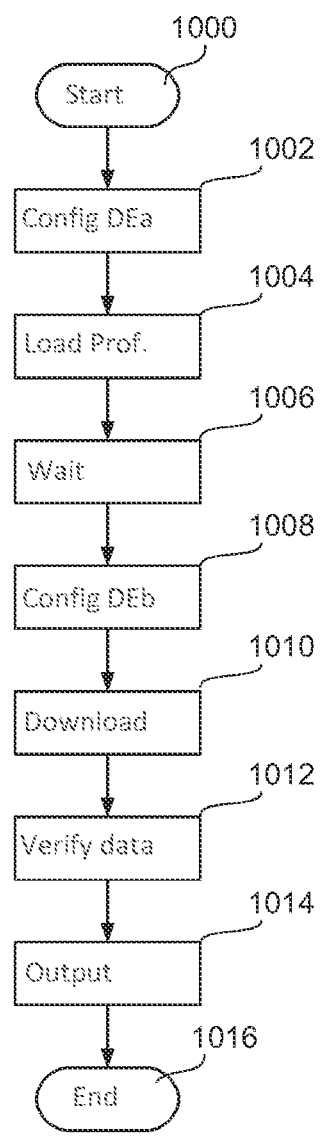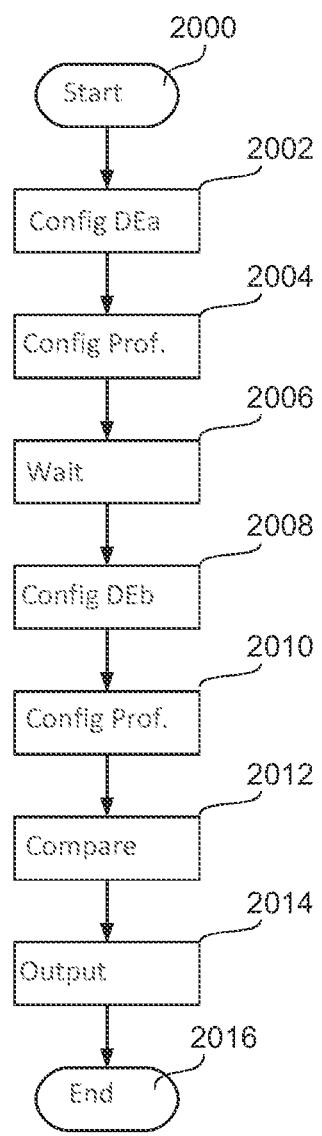
*Fig. 5*  *Fig. 10*

DEBUG SYSTEM, AND RELATED INTEGRATED CIRCUIT AND METHOD

BACKGROUND

1. Technical Field

The present disclosure relates to debug systems and methods. Embodiments have been developed with particular attention paid to possible use for analyzing the operation of an integrated circuit.

2. Description of the Prior Art

Systems contained within an integrated circuit (Systems-on-Chip or SoCs) and systems in a single package (Systems-in-Package or SiPs) typically comprise a plurality of circuits that communicate with one another via a shared communication channel. For instance, said communication channel may be a bus or a communication network, such as, for example, a Network-On-Chip (NoC) or a Network-in-Package (NiP), and is frequently referred to as an "interconnection network" (ICN).

For instance, said SoCs are frequently used for processors designed for mobile or multimedia applications, such as, for example, smartphones, set-top boxes, or routers for domestic uses.

Even though each circuit of a SoC has been checked individually, certain problems may arise only when the entire system operates together; for instance, there may occur interruption or blocking, or the quality of the video or audio may be insufficient.

Consequently, there are frequently provided mechanisms that enable identification of the origin of the error and possibly find a solution. In general, said analysis or debugging mechanisms enable analysis of the behavior of the circuit at a silicon level, i.e., directly within the integrated circuit. For instance, the debug interface of a microcontroller typically enables analysis of the contents of the registers and memories of the microcontroller.

For instance, within a complex integrated system, a problem may arise at the level of printed circuit board (PCBs), at the level of integrated circuits, for example within a SoC, at the level of operating system, or at the level of application. In this case, some problems may even arise only when the entire platform has been assembled and programmed. Consequently, a problem could be solved directly via a modification at the software level, but in general there could also be an advantageous correction at a circuit level, i.e., at a hardware level.

However, whereas debugging mechanisms are frequently suitable for analyzing the behavior of the software, these mechanisms are typically insufficient for verifying proper operation of a specific circuit.

BRIEF SUMMARY

Embodiments disclosed herein provide a debugging mechanism that overcomes the drawbacks outlined above.

In fact, the inventors have noted that, to analyze the behavior of a circuit, a mechanism would be expedient that enables not only monitoring of the data exchanged between the various circuits, but also generation of traffic profiles at different points of the integrated system.

With a view to achieving the aforesaid purpose, the subject of the one embodiment is a debug system having the characteristics specified in Claim 1. Embodiments also relate to a corresponding integrated circuit and a corresponding method. Further advantageous characteristics of other embodiments form the subject of the dependent claims.

The claims form an integral part of the technical teaching provided herein in relation to the disclosure.

In various embodiments, the integrated circuit comprises a processor and a plurality of circuits connected through an interconnection network. Associated to each circuit is a respective communication interface configured for exchanging data between the respective circuit and the interconnection network.

In various embodiments, a debug unit is associated to each communication interface.

In particular, in various embodiments, said debug unit is configurable as:

a) data-insertion point, wherein the debug unit transmits data by means of the respective communication interface to the interconnection network; or b) data-reception point, wherein the debug unit receives data by means of the respective communication interface from the interconnection network.

For instance, in various embodiments the debug unit is configurable by means of a configuration register that can be written and read through software instructions that are executed by the processor.

In various embodiments, the destination for transmission of the data and/or the source for reception of the data is configurable for each debug unit.

In various embodiments, the traffic profile that is to be transmitted by the debug unit is also configurable, and the transmission can also be repeated.

In various embodiments, the debug unit sends the data received to the processor.

In various embodiments, the debug unit compares the data received with a given traffic profile and notifies the processor only of the result of the comparison.

Consequently, with the debug units described herein, a first debug unit can be configured as a data-insertion point, and a second debug unit can be configured as a data-reception point.

In this case, the processor or possibly also directly the second debug unit configured as a data-reception point can compare the data transmitted by the first debug unit with the data received by the second debug unit.

BRIEF DESCRIPTION OF THE SEVERAL VIEWS OF THE DRAWINGS

Embodiments will now be described purely by way of non-limiting example with reference to the annexed drawings, wherein:

FIGS. 5 and 10 show flowcharts of debug methods that can be obtained with some embodiments of the present description.

DETAILED DESCRIPTION

In the ensuing description, various specific details are illustrated aimed at providing an in-depth understanding of the embodiments. The embodiments may be obtained without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in various points of the present description do not necessarily refer to one and the same embodiment. Moreover, particular conformations, structures, or characteristics may be combined in any adequate way in one or more embodiments.

The references used herein are provided merely for convenience and hence do not define the sphere of protection or the scope of the embodiments.

As mentioned previously, the embodiments described herein provide a debugging mechanism that enables better analysis of operation of an integrated system.

Figure 1:
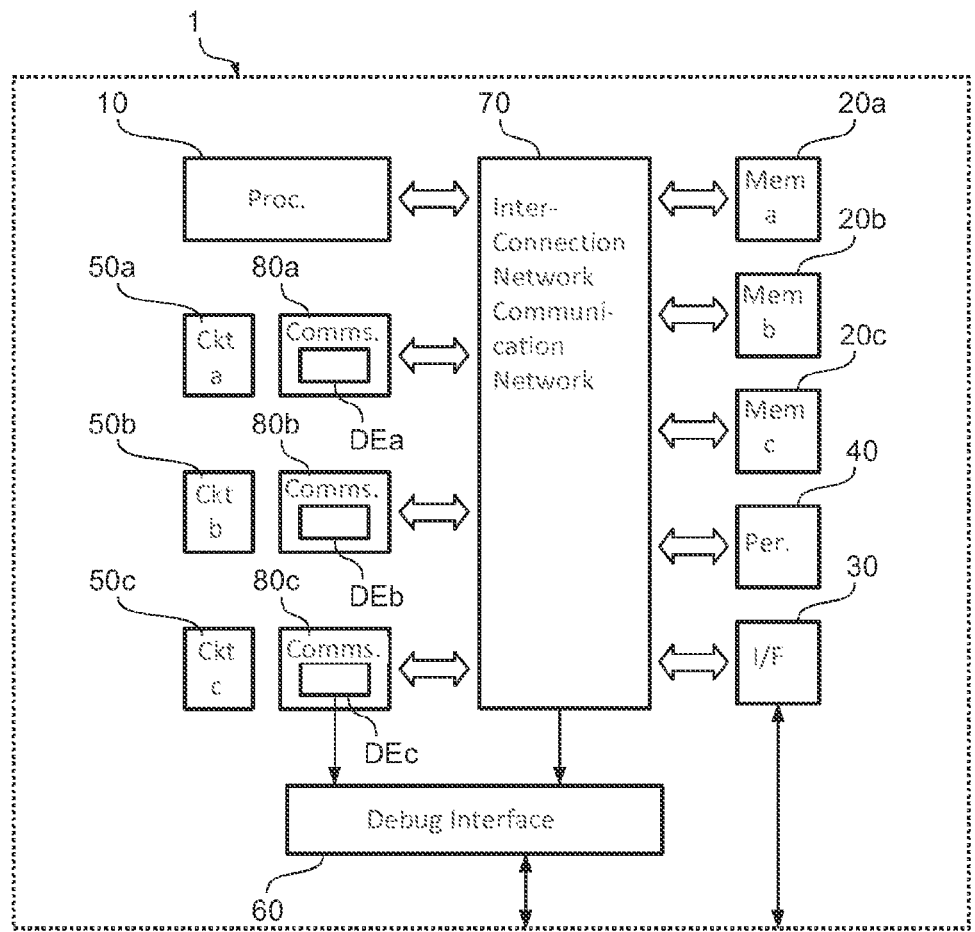
FIGS. 1 and 4 show block diagrams of possible embodiments of integrated circuits that comprise a debug unit according to the present disclosure.

FIG. 1 shows an embodiment of an illustrative SoC 1.

In the embodiment considered, the system comprises a processor 10 and one or more memories 20. For instance, in the embodiment considered a small internal memory 20a, such as, for example, a RAM (Random-Access Memory), a nonvolatile memory 20b, such as, for example, a flash memory, and a communication interface 20c for an external memory, such as, for example, a further DDR memory, are illustrated.

In the embodiment considered, the system also comprises interface circuits 30, such as, for example, input and output (I/O) ports, a UART (Universal Asynchronous Receiver-Transmitter) interface, an SPI (Serial Peripheral Interface), a USB (Universal Serial Bus) interface; and/or other digital and/or analog communication interfaces.

In the embodiment considered, the system also comprises further peripherals 40, such as, for example, comparators, timers, analog-to-digital or digital-to-analog converters, etc.

In the embodiment considered, said modules, i.e., the blocks 10, 20, 30 and 40, are connected together through a communication channel 70, such as, for example, a bus or preferably a Network-On-Chip (NoC).

The general architecture described previously is frequently used for conventional microcontrollers, which renders any detailed description superfluous. Basically said architecture enables interfacing of the processor 10 with the various blocks 20, 30 and 40 via software commands that are executed by means of the processor 10.

The blocks described previously are frequently used in a plurality of different SoCs and are typically well tested. Instead, in multimedia or mobile processors other blocks 50 are added to said generic architectures, which will be referred to hereinafter as Intellectual Property (IP) circuits. For instance, said IP blocks 50 may comprise an image or video coder or decoder 50a, an audio-signal coder or decoder 50b, a WiFi communication interface 50c, or in general blocks, the hardware structure of which is structured to improve implementation of functions that depend upon the application of the system. Said blocks may even be autonomous and interface directly with the other blocks of the system, for example the memories 20 and the other peripherals 30 and 40.

Typically, associated to each IP block 50 is a respective communication interface 80 configured for exchanging data between the IP block 50 and the communication channel 70. For instance, for this purpose the interface 80 typically comprises one or more FIFO (First-In First-Out) memories and a circuit configured for converting the communication protocol of the respective IP block 50 into the protocol of the communication channel 70.

In the embodiment considered, the system further comprises a debug interface 60. In known systems, said interface 60 typically enables monitoring of the registers of the processor 10 and the registers of the other peripherals 30 and 40, which are typically referred to as SFRs (Special-Function Registers), and downloading of the contents of the memories 20. In some cases, the debug interface 60 also enables variation of the contents of said registers and of the memory 20.

In various embodiments, the debug interface 60 can also monitor the communication channel 70, i.e., detect the identifier of the initiator of a communication, the identifier of the destination of the communication, and the data exchanged.

However, in general, there are not provided mechanisms that enable direct monitoring of operation of the IP blocks 50. Frequently, this analysis can be performed only indirectly, for example by controlling the contents of the memories 20 associated to a certain IP block 50.

Consequently, in various embodiments, other circuits are added that enable also direct interaction with the individual blocks 50.

In the embodiment considered, the communication interfaces 80 are modified, and a configurable debug unit DE is added.

For instance, in a preferred embodiment, each debug unit DE comprises a plurality of configuration registers that can be configured, i.e., written and read, via the processor 10. For example, in one embodiment, said configuration registers of each debug unit DE can be configured as the configuration registers of the other peripherals 30 and 40.

For instance, in the embodiment considered, the processor 10 can execute software-code operations that request configuration of a specific debug unit DE. Said configuration command is sent to the communication channel 70 and forwarded to the respective interface 80.

For instance, in one embodiment, each debug unit DE enables transmission of a traffic profile. Preferably, the debug unit DE exploits for this purpose the existing circuits of the respective interface 80. For instance, in one embodiment, the debug unit DE stores the data directly in the FIFO memory of the respective interface 80, and consequently the debug unit DE may have a low complexity; for example, it may even not include a FIFO memory.

Consequently, in the embodiment considered, the user can generate traffic profiles exploiting the existing architecture of the system, in particular the processor 10, the communication channel 70, and possibly the memory 20.

For instance, in one embodiment, the debug unit DE supports two operating modes.

In the first operating mode, the user can enter personalized traffic profiles through the debug unit DE. For instance, this mode can be used for entering in the FIFO memory of the respective interface 80 data that subsequently are transmitted through the communication channel 70 to another circuit of the system, for example to a memory 20 or an interface 80 of a further IP block 50.

In one embodiment, said operating mode also supports a repetition mode, where one and the same personalized traffic profile is transmitted a plurality of times.

In the second operating mode, the debug unit DE autonomously generates predefined traffic profiles. For instance, the user could select and/or configure (by means of an appropriate programming of the configuration registers) certain predefined traffic profiles.

In one embodiment, the debug unit DE in this case also enables direct verification of the integrity of the data. For instance, this operating mode can be used for generating predefined traffic profiles that are transmitted through the communication channel 70 to another interface 80, the debug unit DE of which verifies the integrity of the data autonomously.

Described in what follows is a possible embodiment of the communication interface 80 and of the respective debug unit DE.

Figure 2:
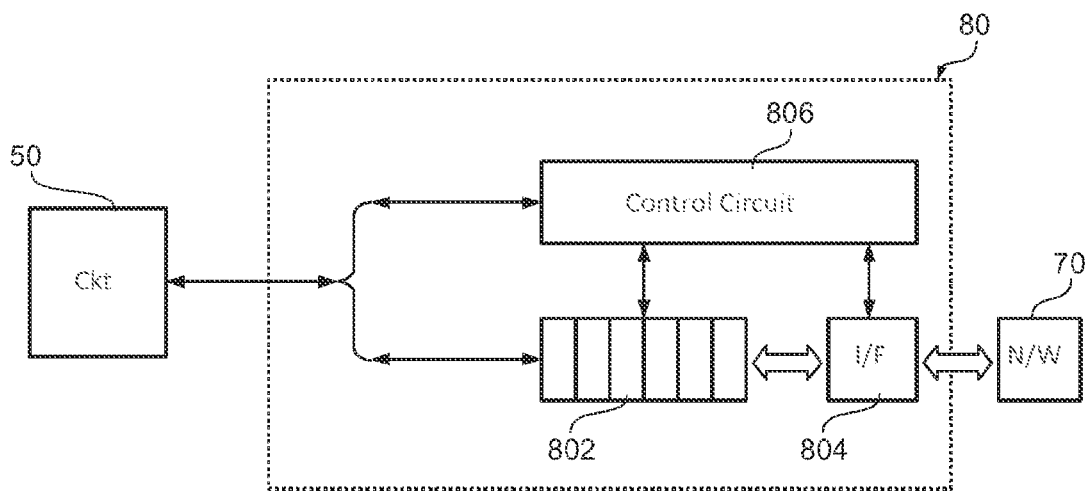
FIG. 2 shows a comprehensive communication interface.

FIG. 2 shows a block diagram of a comprehensive communication interface 80.

In the embodiment considered, the communication interface 80 comprises three distinct blocks:
- a memory 802 for temporary saving of data at input and/or output, i.e., of the data coming from the respective IP block 50 and/or from the communication channel 70, such as, for example, a FIFO reception memory and a FIFO transmission memory,
- an interface 804 for exchanging data between the memory 802 and the communication channel 70, for example for sending the data saved in the FIFO transmission memory to the communication channel 70 and saving the data received from the communication channel 70 in the FIFO reception memory; and
- a control circuit 806 that, for example, controls the flow of data between the IP block 50 and the communication channel 70, monitors the state of the memory 802, and generates the control signals for the IP block 50.

In the embodiment considered, no interface is represented for data exchange between the IP block 50 and the memory 802, because typically the IP block 50 is able to exchange the data directly with the memory 802, for example exploiting the control signals generated by the control circuit 806. For instance, typically access to the memory 802 is a DMA (Direct Memory Access).

Figure 3:
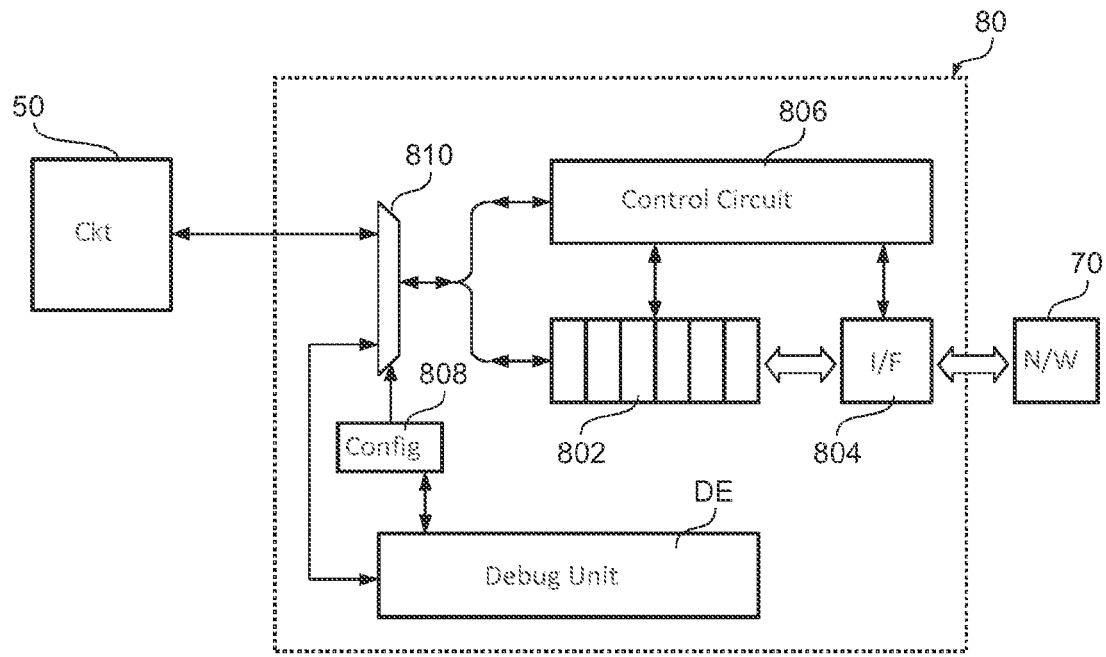
FIGS. 3 and 6 to 9 show possible embodiments of a communication interface according to the present description.

Instead, FIG. 3 shows a block diagram of a modified communication interface 80.

In the embodiment considered, the interface 80 further comprises:
- a configuration register 808, which can be written and/or read through the processor 10 of the system; and
- a debug unit DE, which can exchange data with the memory 802, for example write data in the FIFO transmission memory or receive data from the FIFO reception memory.

In various embodiments, the configuration register 808 can be written and read as the configuration registers of the other peripherals 30 and 40, for example assigning to the configuration register 808 a specific address or range of addresses, taking into account that to the various communication interfaces 80 different addresses or ranges of addresses are preferably assigned to enable an individual configuration of each configuration register 808. For instance, in the case where a NoC were to be used, each communication interface 80 would already have a different network address. In this case, all the configuration registers 808 could even have one and the same local memory address.

In various embodiments, the configuration register 808 enables activation of the debug unit DE. For instance, in the embodiment considered, via programming of a flag in the configuration registers 808 it is possible to decide whether data exchange occurs with the IP block 50 or with the debug unit DE.

For instance, in the embodiment considered, the interface 80 comprises a multiplexer/demultiplexer 810, which selectively connects the control unit 806 and the memory 802 to the IP block 50 or to the debug unit DE, where the selection is controlled on the basis of the values stored in the configuration register 808.

As mentioned previously, in various embodiments, the configuration register 808 moreover enables control of operation of the debug unit DE.

For instance, in one embodiment, the debug unit DE can be configured as a data-insertion point or as data-reception point.

When the debug unit DE is configured as a data-insertion point, the debug unit DE generates certain traffic profiles, which, as described previously, may be personalized and/or pre-set. For instance, in one embodiment, it is possible to set through the configuration register 808 the destination of the communication. For instance, in one embodiment, an initial address within the memory or memories 20 may be specified, and the debug unit DE subsequently sends the data to the respective addresses in said memory 20, for example incrementing automatically the address after each writing operation.

Instead, when the debug unit DE is configured as data-reception point, the debug unit DE enables data reception. For instance, in one embodiment, the debug unit DE monitors the data received in the memory 802.

Moreover, in various embodiments, when the debug unit DE is configured as a data-reception point, the debug unit DE can also request autonomously data from a destination. For example, in one embodiment, an initial address inside the memory or memories 20 may be specified, and the debug unit DE subsequently reads the data saved at the respective addresses in said memory, for example incrementing automatically the address after each reading operation.

Figure 4:
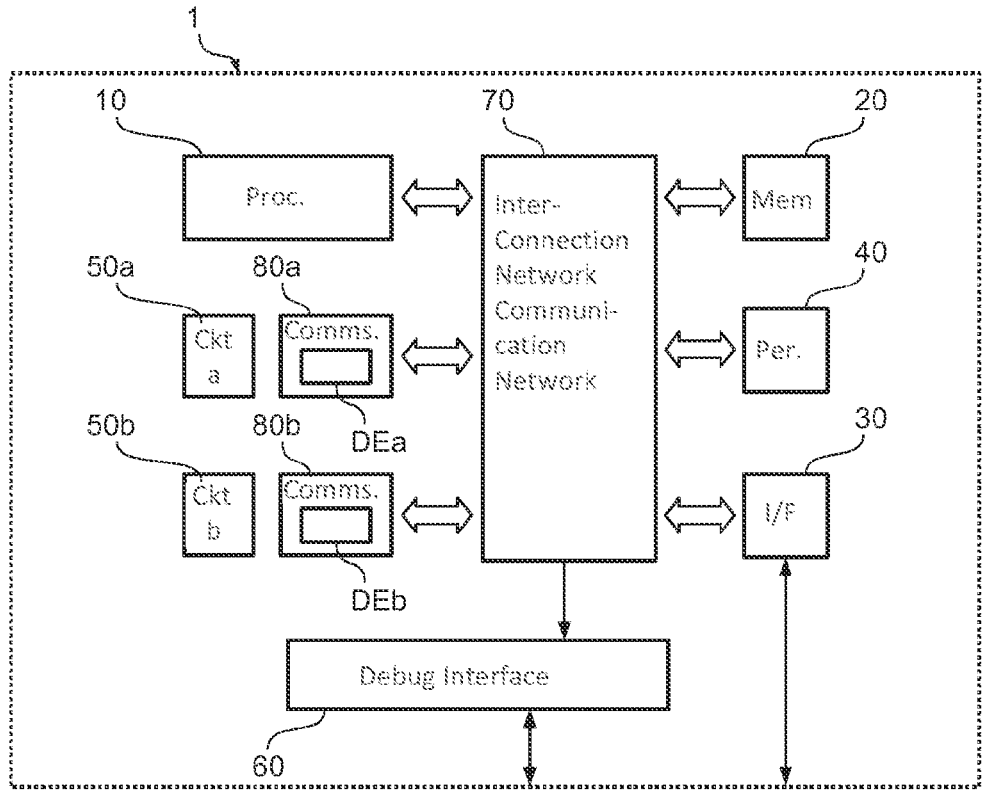

For instance, FIG. 4 shows an embodiment of a SoC, in which two debug units $DE_a$ and $DE_b$ are activated, where the first debug unit $DE_a$ of the interface 80a is configured as a data-insertion point, and the second debug unit $DE_b$ of the interface 80b is configured as a data-reception point.

For instance, in this mode, the debug unit $DE_a$ could write data in a memory 20 and the debug unit $DE_b$ could read the data once again from said memory 20.

Consequently, by controlling the data read from the memory 20, it is possible to verify the integrity of the data. For instance, said operation can be performed via the processor 10, which downloads the data read by the debug unit $DE_b$. However, in general, also a debug unit DE could directly verify the integrity of the data. For instance, for this purpose, one and the same traffic profile could be configured both in the data-insertion point $DE_a$ and in the data-reception point $DE_b$. In this case, the data-reception point $DE_b$ could verify autonomously whether the data received, for example read from the memory 20, correspond to the traffic profile configured previously.

For example, FIG. 5 shows a flowchart of one embodiment, where the processor 10 is programmed for controlling all the steps of the verification.

After a starting step 1000, the processor 10 configures, in a step 1002, the debug unit $DE_a$ of the interface 80a as a data-insertion point, for example configuring the destination memory 20 and the initial memory address and the final memory address.

In a step 1004, the processor 10 loads a personalized traffic profile in the debug unit $DE_a$.

Next, the processor 10 waits, in a step 1006, for completion of the data exchange between the debug unit $DE_a$ and the destination memory 20.

In a step 1008, the processor 10 configures the debug unit $DE_b$ of the interface 80b as a data-reception point, for example configuring the same destination memory 20 and the same initial and final memory addresses.

Consequently, the processor 10 can access the destination memory 20 through the debug unit $DE_b$.

Next, the processor 10 can download, in a step 1010, the data read by the debug unit $DE_b$ and verify in a step 1012 the correctness of the data received.

Finally, the processor 10 can send, in a step 1014, the result of the verification to the user, for instance using one of the communication interfaces 30 of the system 1, and the procedure terminates in a final step 1016.

Figure 6:
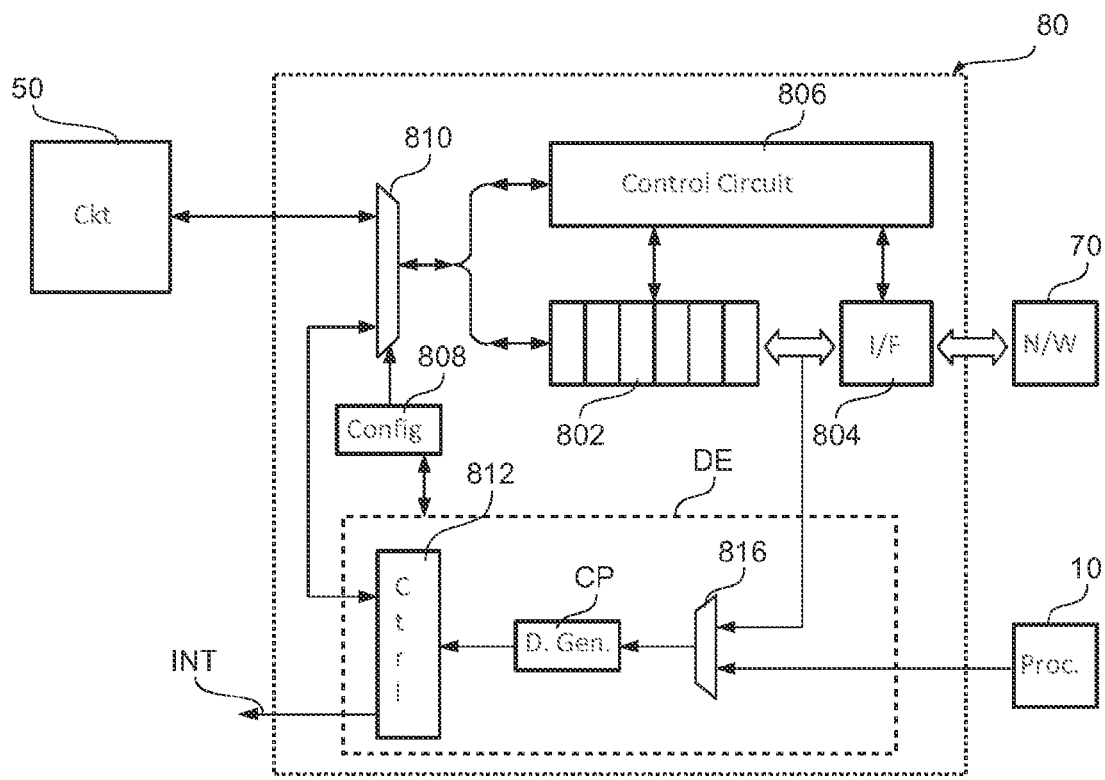

FIG. 6 shows a possible embodiment of the debug unit DE when it is configured as a data-insertion point, in particular in the personalized-traffic-profile operating mode.

In the embodiment considered, the debug unit DE comprises a module CP responsible for generation of the data to be sent to the memory 802 of the interface 80.

In the embodiment considered, said module CP can be configured through the processor 10, for example via a command that writes the traffic profile at a given memory address associated to the module CP.

In the embodiment considered, the debug unit DE further comprises a control circuit 812, which manages transmission of the data supplied by the module CP to the memory 802. For instance, in the embodiment considered, the control circuit 812 sends the data to the FIFO transmission memory.

In the embodiment, the control circuit 812 can be configured for generating an interrupt INT when transmission of the data is terminated. This interrupt INT may be a hardware interrupt, i.e., connected directly to the processor 10, and/or a software interrupt, i.e., an interrupt obtained via a flag within the configuration register 808.

In the embodiment, the debug unit DE can also be configured for repeating transmission of the traffic profile. For instance, in the embodiment considered, the output of the transmission memory is also connected to the module CP in such a way that the data transmitted are re-entered via the module CP into the transmission memory. For instance, in the embodiment considered, a multiplexer 816 is illustrated, which enables selection of whether the module CP receives the data from the transmission memory 802 or from the processor 10.

As mentioned previously, in various embodiments, the debug unit DE can be configured for generating pre-set traffic profiles.

Figure 7:
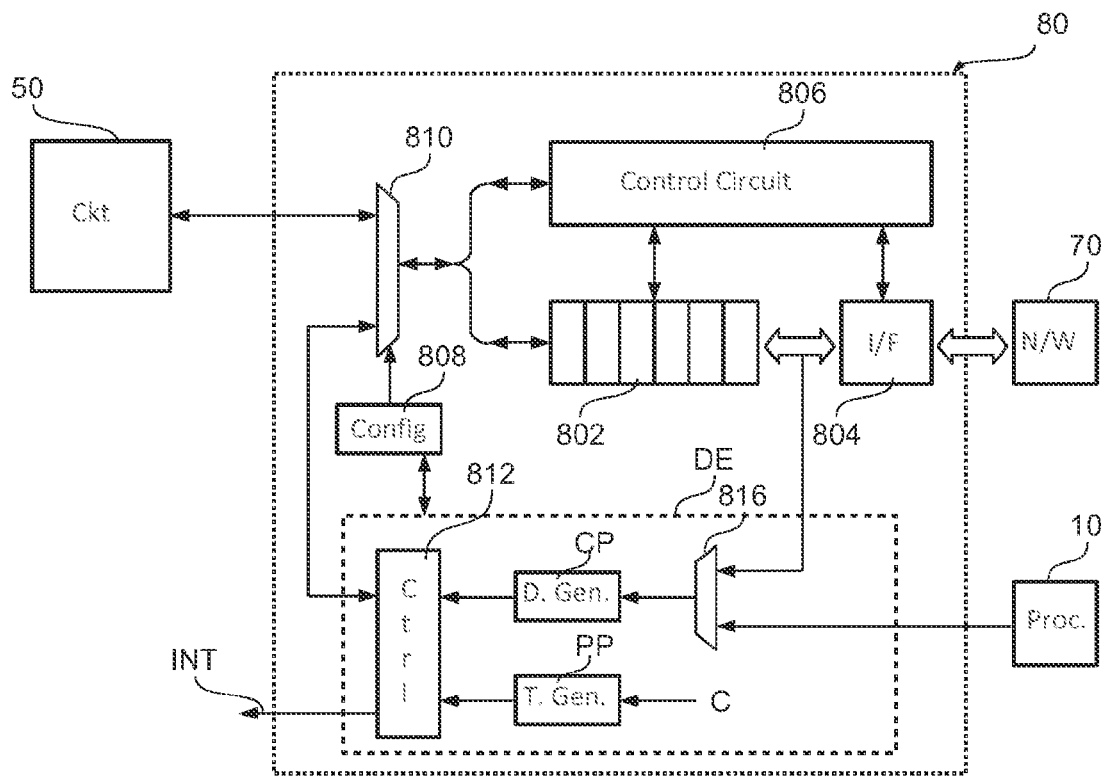

For instance, FIG. 7 shows a possible embodiment of the debug unit DE when it is configured as a data-insertion point, which supports a personalized-traffic-profile operating mode and a preset-traffic-profile operating mode.

Substantially, the embodiment is based upon the embodiment illustrated in FIG. 6, with the addition of a module PP configured for generating pre-set traffic profiles.

For instance, in the embodiment considered, both the module CP that generates personalized traffic profiles and the module PP that generates pre-set traffic profiles are connected to the control circuit 812, which selects, for example on the basis of the configuration stored in the configuration register 808, which data is preferably transmitted by means of the communication interface 80.

Typically, the module PP supports different traffic profiles C that can be chosen, for example via an appropriate configuration of the configuration register 808. Moreover, also the traffic profile C could be itself configurable.

Figure 8:
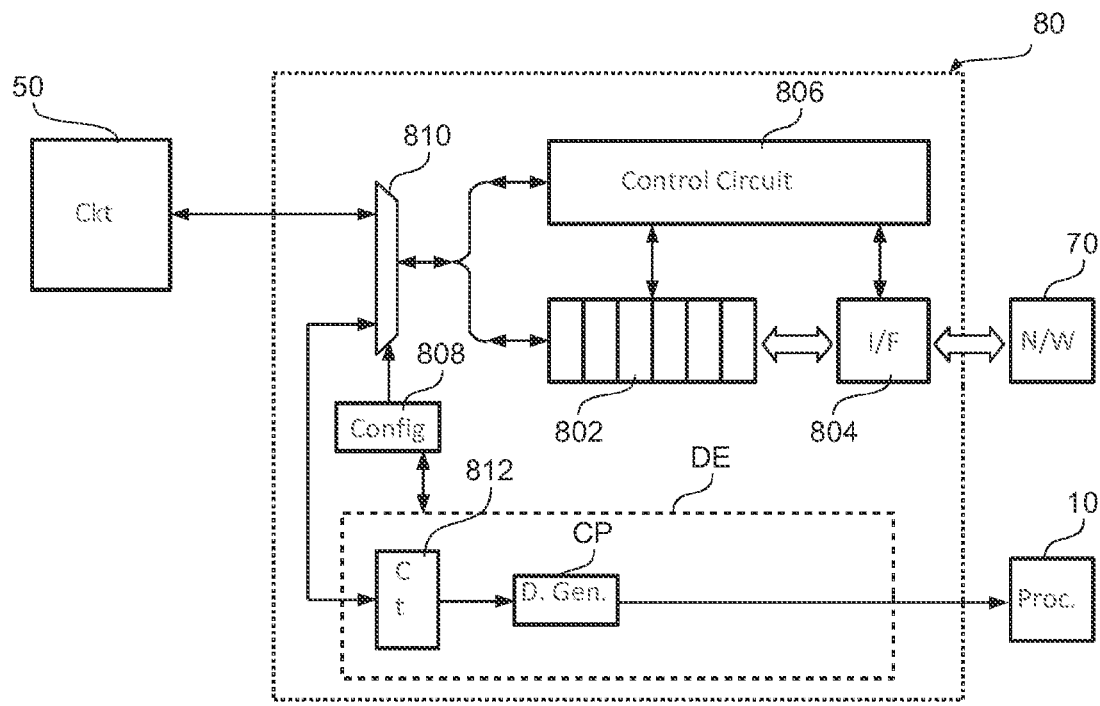

FIG. 8 shows a possible embodiment of the debug unit DE when it is configured as data-reception point.

In the embodiment considered, the debug unit DE comprises a module CP, which:

a) requests by means of the interface 80 reading of data from a data destination, and b) sends the data read to the processor 10.

Also in this case, the module CP can be configured through the processor 10, for example via a command that writes an initial memory address and/or final memory address in the configuration register 808.

In the embodiment considered, the debug unit DE further comprises a control circuit 810 that manages the request for the data from the memory addresses configured and forwards the data to the module CP.

Also in this case, it may be envisaged that the control circuit 810 generates an interrupt when reception of the data is terminated. However, in general, the debug unit DE could even download only data, when the processor requests reading of data from a given memory address associated to the module CP; namely, with each operation of reading from the address associated to the module CP a datum is unloaded from the destination memory through the interface 80.

As mentioned previously, the debug unit DE could also verify autonomously the integrity of the data.

Figure 9:
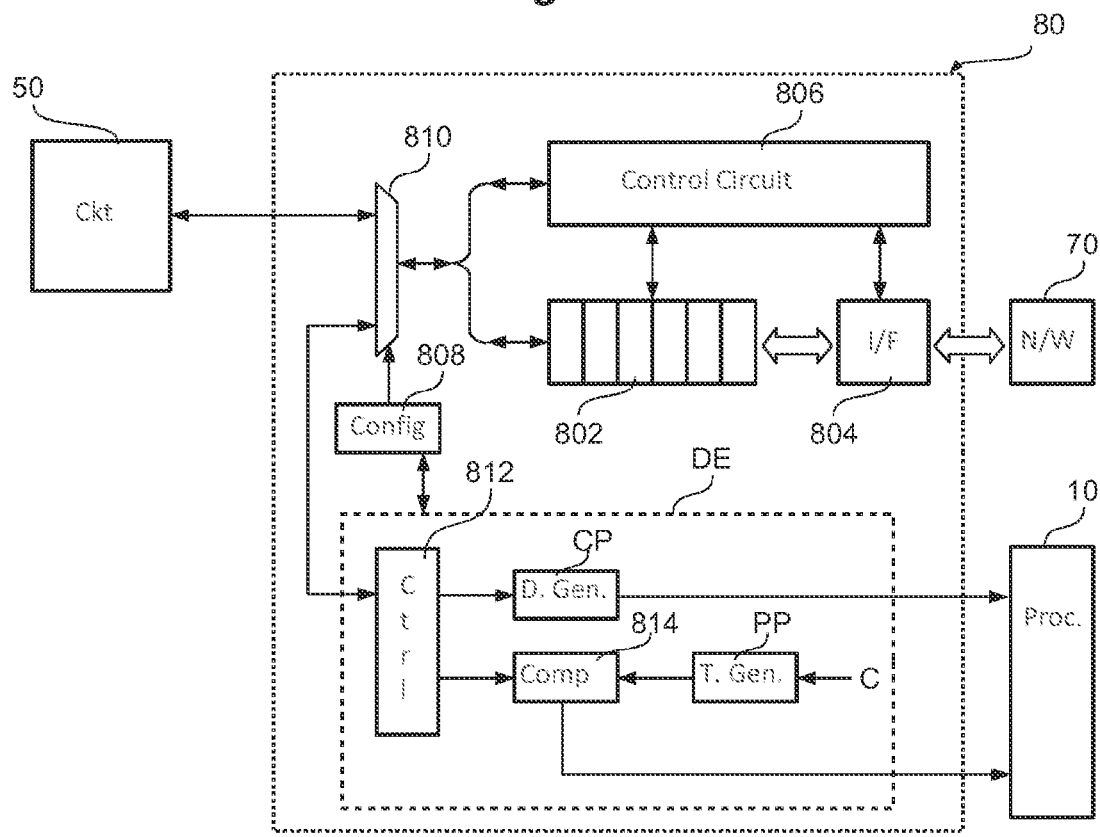

For instance, FIG. 9 shows a possible embodiment of the debug unit DE when it is configured as data-reception point, which supports an operating mode in which the data received can be verified.

Substantially, the embodiment is based upon the embodiment illustrated in FIG. 8, with the addition of a module PP that enables verification of pre-set traffic profiles.

For instance, in the embodiment considered, said module PP basically corresponds to the module PP described with reference to FIGS. 7. Consequently, also said module PP can be configured for generating pre-set traffic profiles C. For example, typically one and the same traffic profile is configured for a transmission point and for a reception point. In this case, the data generated by the module PP of the reception point should be identical to the data received.

Consequently, in the embodiment considered, the data received by means of the control circuit 812 and the data generated by the module PP are compared by a comparator 814, and in the case where the data were not to correspond, an error signal may be generated, such as, for example, a hardware and/or software interrupt.

For instance, FIG. 10 shows a flowchart of one embodiment, where the processor 10 configures two debug units $DE_a$ and $DE_b$ for executing autonomously a verification of integrity of the data (see FIG. 3 for a possible embodiment of the hardware architecture of the system).

After a starting step 2000, the processor 10 configures in a step 2002 the debug unit $DE_a$ of the interface 80a as a data-insertion point, for example, configuring the destination memory 20 and the initial memory address and the final memory address.

In a step 2004, the processor 10 configures the pre-set traffic profile that the module PP of the debug unit $DE_a$ has to generate.

Next, the processor 10 waits, in a step 2006, for completion of the data exchange between the debug unit $DE_a$ and the destination memory 20.

In a step 2008, the processor 10 configures the debug unit $DE_b$ of the interface 80b as data-reception point, for example, configuring the same destination memory 20 and the same initial and final memory addresses.

In a step 2010, the processor 10 configures the traffic profile C that the module PP of the debug unit $DE_b$ has to generate, where said traffic profile corresponds to the traffic profile configured in step 2004.

Next, the processor 10 can verify, in a step 2012, only the result of the comparison supplied by the comparator 814 of the debug unit $DE_b$.

Finally, the processor 10 can send, in a step 2014, the result of the verification to the user, for example, using one of the communication interfaces 30 of the system 1, and the procedure terminates in a final step 2016.

Consequently, thanks to the solutions described herein, operation of the system 1 can be monitored in different points of the system. In fact, the debug unit DE described herein enables transmission and reception of data in different points of the system. Consequently, it is possible to monitor, for example, operation of the communication channel 70, of the memories 20, or also of individual IP blocks 50 by sending traffic profiles that emulate operation of other components of the system.

Finally, the complexity of the additional circuits is minimal, because already existing components are reused, in particular the reception and transmission part of the communication interfaces 70.

Of course, without prejudice to the principle of the invention, the details of construction and the embodiments may vary widely with respect to what has been described and illustrated herein, purely by way of example, without thereby departing from the scope of the present invention, as defined by the ensuing claims.

The various embodiments described above can be combined to provide further embodiments. The embodiments may include structures that are directly coupled and structures that are indirectly coupled via electrical connections through other intervening structures not shown in the figures and not described for simplicity. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
    a processor;
    a plurality of circuits;
    an interconnection network coupling the processor and the plurality of circuits, wherein to each circuit is associated a respective communication interface configured to exchange data between the respective plurality of circuits and the interconnection network; and
    a debug unit associated with each communication interface, wherein each debug unit is configurable as:
        a data-insertion point, wherein said debug unit transmits data via the respective communication interface to said interconnection network, and wherein a destination for the transmission of said data is configurable, or
        a data-reception point, wherein said debug unit receives data via the respective communication interface from said interconnection network, wherein each debug unit includes at least one of:
            a first transmission module configured to receive from said processor a personalized traffic profile, and configured to transmit said personalized traffic profile via the respective communication interface to said interconnection network; and
            a second transmission module configured to receive from said processor a selection request or a configuration request of a predefined traffic profile, and configured to transmit said predefined traffic profile via the respective communication interface to said interconnection network.

2. The system according to claim 1 wherein said debug unit comprises a configuration register that can be configured through software instructions executed by said processor.

3. The system according to claim 1 wherein a source for reception of said data is configurable.

4. The system according to claim 1 wherein said debug unit is configured to generate at least one of a hardware interrupt and a software interrupt when the transmission or reception of said data is completed.

5. The system according to claim 1 wherein said debug unit is configured to repeat transmission of said personalized profile or said pre-set traffic profile.

6. The system according to claim 1 wherein said debug unit comprises at least one of:
    a first reception module configured to receive from the respective communication interface a traffic profile, and configured to transmit said traffic profile to said processor; and
    a second reception module configured to receive from said processor a request for selection and configuration of a predefined traffic profile, configured to generate said predefined traffic profile, configured to receive from the respective communication interface a traffic profile, configured to compare said received traffic profile with said predefined traffic profile, and configured to send to said processor a signal identifying the result of said comparison of said received traffic profile with said predefined traffic profile.

7. The system according to claim 1 wherein each communication interface comprises:
    a transmission and reception memory;
    an interface to send the data in said transmission and reception memory to said interconnection network and to store the data received from said interconnection network into said transmission and reception memory; and
    a control circuit configured to handle communication between the circuit associated to the communication interface and said transmission and reception memory.

8. The system according to claim 7, comprising:
    a selection circuit configured to select whether the exchange of data with said transmission and reception memory occurs with the circuit associated to said communication interface or with said debug unit associated to said communication interface.

9. An integrated circuit, comprising:
    a processor;
    at least two circuit modules;
    an interconnection network coupling the processor and the at least two circuit modules, each circuit module having a respective communication interface configured to exchange data between the respective circuit module and the interconnection network; and
    a debug unit associated with each communication interface, each debug unit configurable as:
        a data-insertion point to permit the debug unit to transmit data via the respective communication interface to the interconnection network, and
        a data-reception point to permit the debug unit to receive data via the respective communication interface from the interconnection network,
    wherein each debug unit has a first transmission module configured to receive from e processor a personalized traffic profile, and wherein each debug unit is configured to transmit the personalized traffic profile via the respective communication interface to the interconnection network.

10. The integrated circuit of claim 9 wherein the debug unit comprises:
a second transmission module configured to receive from the processor a configuration request of a predefined traffic profile, and configured to transmit the predefined traffic profile via the respective communication interface to the interconnection network.

11. The integrated circuit of claim 9 wherein the debug unit comprises:
a memory;
an interface configured to pass data from the memory to the interconnection network and configured to pass data to the memory from the interconnection network; and
a control circuit configured to control data flow between the circuit module associated with the communication interface and the memory.

12. The integrated circuit of claim 9 wherein the debug unit comprises:
a configuration register configurable via software instructions executed by said processor.

13. The integrated circuit of claim 12 wherein the debug unit comprises:
an interrupt control circuit configuration to generate an interrupt when transmission of data through the respective communication interface terminates.

14. A method to analyze operation of an integrated circuit, comprising:
configuring a first debug unit as a data-insertion point;
transmitting first data via an associated first communication interface to the interconnection network wherein a destination for the transmission of said first data is configurable;
generating a traffic profile;
transmit the traffic profile via the first debug unit to the interconnection network;
configuring a second debug unit as a data-reception point;
receiving second data via an associated second communication interface from the interconnection network; and
comparing the first data transmitted by said first debug unit with the second data received by said second debug unit.

15. The method to analyze operation of an integrated circuit of claim 14, comprising:
receiving a second traffic profile via the second debug unit; and
comparing the transmitted traffic profile to the received second traffic profile.

16. The method to analyze operation of an integrated circuit of claim 15, comprising:
outputting a result of the comparison.

17. The method to analyze operation of an integrated circuit of claim 14, comprising:
generating an interrupt after transmitting the traffic profile.

* * * * *